United States Patent
Beika et al.

(10) Patent No.: US 8,100,237 B2
(45) Date of Patent: Jan. 24, 2012

(54) ENERGY-ABSORBING DEVICE, IN PARTICULAR IN THE FORM OF A SAFETY DEVICE AGAINST SHOCK LOADS FOR A TRACK-BORNE VEHICLE

(75) Inventors: Uwe Beika, Lubbenau (DE); Sascha Ende, Eschershausen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 12/878,097

(22) Filed: Sep. 9, 2010

(65) Prior Publication Data

US 2011/0062730 A1 Mar. 17, 2011

(30) Foreign Application Priority Data

Sep. 15, 2009 (EP) .................................. 09170370

(51) Int. Cl.
*F16F 7/12* (2006.01)
(52) U.S. Cl. ......................... 188/371; 293/133
(58) Field of Classification Search .......... 188/371–377; 293/130, 133
See application file for complete search history.

(56) References Cited

U.S. PATENT DOCUMENTS

| 4,995,486 | A | * | 2/1991 | Garneweidner | ............. | 188/374 |
| 5,181,589 | A | * | 1/1993 | Siegner et al. | ............... | 188/374 |
| 6,601,886 | B1 | * | 8/2003 | Thayer | ......................... | 293/133 |
| 2009/0065462 | A1 | * | 3/2009 | Gansweidt | ................... | 213/1 A |

FOREIGN PATENT DOCUMENTS

| EP | 0 802 100 A1 | 10/1997 |
| EP | 1 905 661 A1 | 4/2008 |
| FR | 2 528 928 A1 | 12/1983 |
| FR | 2 775 240 A1 | 8/1999 |
| FR | 2 777 251 A1 | 10/1999 |
| GB | 2 257 770 A | 1/1993 |

OTHER PUBLICATIONS

European Search Report, EP Application No. 09170370.2, mailed Apr. 22, 2010, 5 pages.

* cited by examiner

*Primary Examiner* — Christopher Schwartz
(74) *Attorney, Agent, or Firm* — Cesari and McKenna, LLP; John F. McKenna

(57) ABSTRACT

An energy-absorbing device in the form of a safety device against shock loads for a track-borne vehicle includes an energy-absorbing member and a mating member. The mating member co-operates with the energy-absorbing member in such a way that, if a critical shock force applied to the energy-absorbing device is exceeded, the mating member and the energy-absorbing member move relative to one another, towards one another, while at the same time absorbing at least some of the shock energy which is applied to the energy-absorbing device. To enable the overall energy which can be dissipated by the energy-absorbing device to be increased in a way which is easy to implement, provision is made for the energy-absorbing member to have at least one energy-absorbing region made of fibrous composite material which, in the course of the movement of the mating member relative to the energy-absorbing member, is at least partly reduced to fibers non-ductilely.

15 Claims, 4 Drawing Sheets

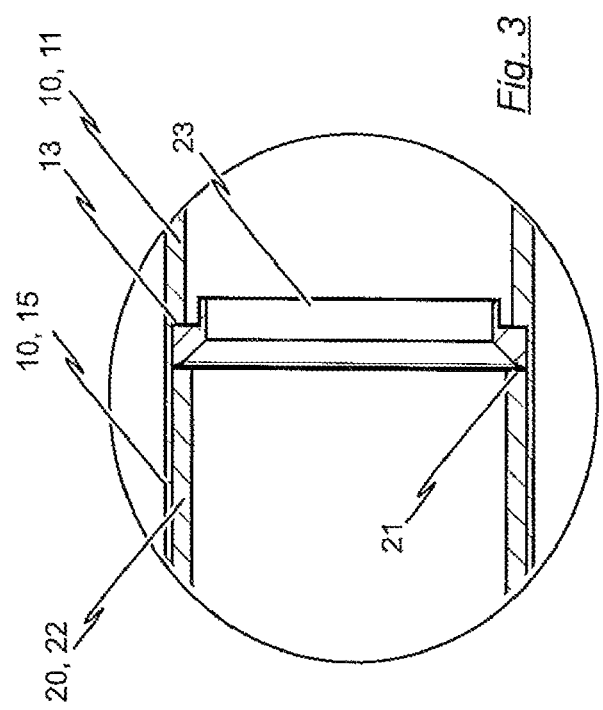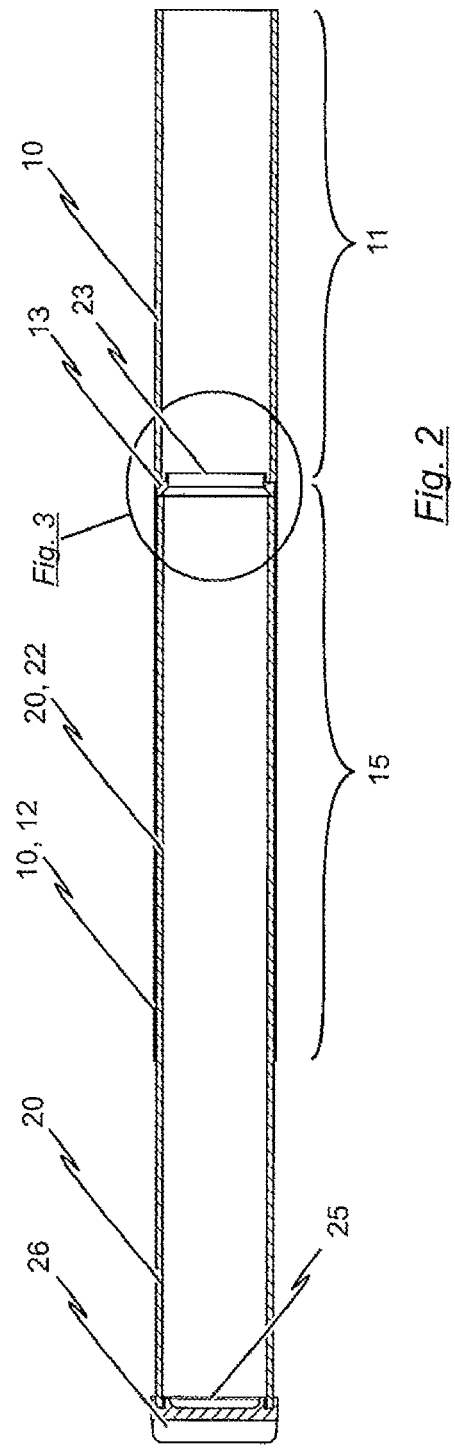

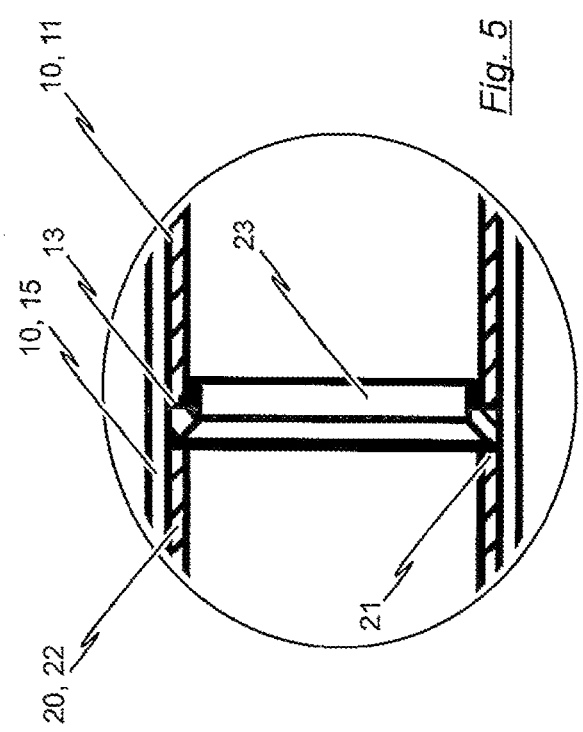
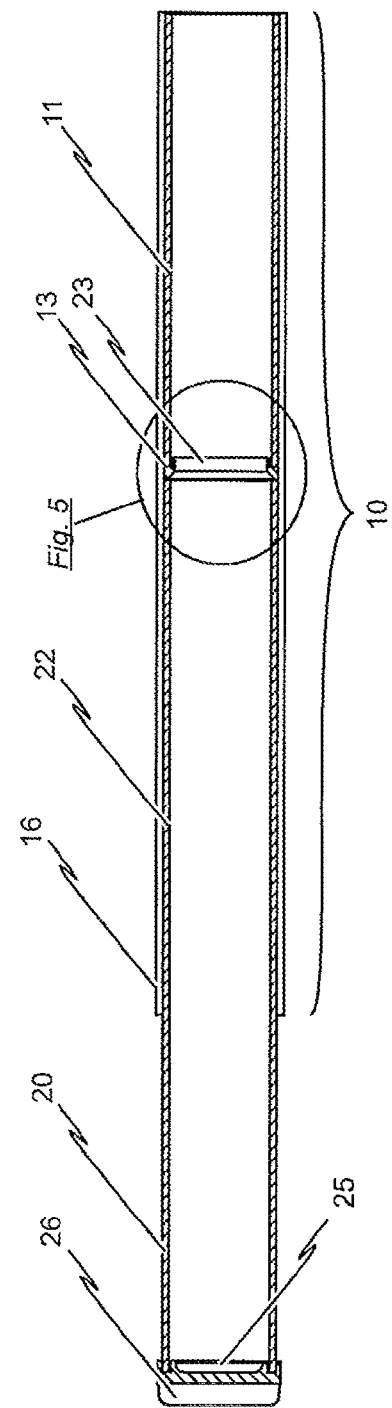

ENERGY-ABSORBING DEVICE, IN PARTICULAR IN THE FORM OF A SAFETY DEVICE AGAINST SHOCK LOADS FOR A TRACK-BORNE VEHICLE

BACKGROUND OF THE INVENTION

1. Field of the Invention

The invention relates to an energy-absorbing device, in particular in the form of safety device against shock loads for a track-borne vehicle, the energy-absorbing device having an energy-absorbing member and a mating member which co-operates with the energy-absorbing member in such a way that, if a critical shock force applied to the energy-absorbing device is exceeded, the mating member and the energy-absorbing member move relative to one another, towards one another, while at the same time absorbing at least some of the shock energy which is applied to the energy-absorbing device.

2. Prior Art

It is known for track-borne vehicles, such as rail-borne vehicles for example, to be fitted with a safety device against shock loads which has at least one energy-absorbing device the purpose of which is to at least partly dissipate the shock energy which occurs if the vehicles hits an obstacle. An energy-absorbing device which is used in a safety device against shock loads generally has one or more energy-absorbing members. The intention in this case is that the at least one energy-absorbing member, which is generally designed to be destroyed, will protect the main frame of the track-borne vehicles even when, in particular, the closing speeds are quite high.

Energy-absorbing devices designed to be destroyed which are known from the prior art are in particular deformation tubes or crash boxes in which shock energy is destructively converted into work done in deformation and heat by a defined plastic deformation.

Printed publication DE 297 03 351 U1, for example, relates to a member for absorbing kinetic energy, this member operating mechanically on the principle of plastic deformation. Specifically, what is proposed in this piece of prior art is an energy-absorbing device which has a base-plate and a connecting plate, with an energy-absorbing member being clamped between these two plates. The energy-absorbing member is a thick-walled tube of plastics material which on the one hand has a certain initial elasticity and on the other hand has a plastic working travel for which the stress-strain curve is almost rectangular plastic. The initial elasticity of the energy-absorbing member gives protection by deformation when the shock loads are low. After a working travel beyond the yield point, plastic deformation of the energy-absorbing member occurs, and consequently the energy-absorbing member is reduced in length and its outer circumference is enlarged in a bulged shape.

What is known from printed publication WO 2009/034123 A1 on the other hand is a safety device against shock loads which is particularly suitable for use, together with a component for transmitting force, as an additional, irreversible stage for providing safety against shock loads. This safety device against shock loads has an energy-absorbing member in the form of a deformation tube and a mating member in the form of a force-transmitting member. The mating member (force-transmitting member) co-operates in this case with the energy-absorbing member in such a way that, on a characteristic shock force which can be laid down in advance being exceeded, the energy-absorbing member in the form of a deformation tube is deformed plastically and in the process dissipates at least some of the energy which arises when the shock force is transmitted. In the course of the plastic deformation of the deformation tube the deformation tube (energy-absorbing member) and the force-transmitting member (mating member) move relative to one another, towards one another.

SUMMARY OF THE INVENTION

The object underlying the invention is to refine an energy-absorbing device of the kind defined in the opening paragraph, and one such as is known from printed publication WO 2009/034123 A1 for example, to the effect that, in a manner which is easy to implement, even high shock energies can be reliably dissipated, the construction of the energy-absorbing device being simplified at the same time.

This object is achieved by virtue of the subject matter of independent claim 1. Advantageous refinements of the solution according to the invention are specified in the dependent claims.

Hence, an energy-absorbing device having an energy-absorbing member and a mating member is proposed, provision being made in accordance with the invention for the energy-absorbing member to have at least one energy-absorbing region made of fibrous composite material which, in the course of the movement of the mating member relative to the energy-absorbing member, is at least partly reduced to fibres non-ductilely.

What is meant by the term "mating member" used herein is a component which, when the energy-absorbing device responds, causes the non-ductile destruction of the fibrous composite material of the energy-absorbing region of the energy-absorbing member. It is for example conceivable for the mating member to take the form of a piston which performs the function of transmitting the shock force to the energy-absorbing region of the energy-absorbing member, the mating member then moving relative to the structure to be protected such as, say, the main frame of a rail-borne vehicle, on the energy-absorbing device responding. On the other hand, it is of course also conceivable for the mating member to be solidly connected to the structure to be protected, in which case, on the energy-absorbing device responding, the energy-absorbing member moves relative to the structure to be protected and the mating member and travels at least part-way into the mating member.

In the case of the solution according to the invention, at least some of the shock energy applied to the energy-absorbing device is dissipated by virtue of the fact that, rather than being deformed plastically in the way in which it is in conventional energy-absorbing devices, the energy-absorbing region of the energy-absorbing member is at least partly broken down into individual pieces. In other words, when the energy-absorbing device responds the shock energy applied to the energy-absorbing device is used to reduce the energy-absorbing region to fibres and at least part of it is thus dissipated. Because the reduction to fibres and pulverisation of a workpiece takes considerably more energy than a normal plastic deformation process, the energy-absorbing device according to the invention is also particularly suitable for applications in which high shock energies specific to weight have to be dissipated.

On the other hand, an energy-absorbing member formed from fibrous composite material is notable for its lightweight construction as compared with conventional energy-absorbing members (deformation tubes) formed from metal, thus enabling the overall weight of the energy-absorbing device to be reduced.

Fibrous composite materials are built up from reinforcing fibres embedded in polymeric matrix systems. While the matrix holds the fibres in a predetermined position, transmits stresses between the fibres and protects the fibres from external influences, the load-bearing mechanical properties derive from the reinforcing fibres. What are suitable as reinforcing fibres are in particular aramid fibres, glass fibres and carbon fibres. Aramid fibres are of only relatively low stiffness due to their ability to stretch and because of this, what are preferred to form the energy-absorbing region are in particular glass fibres and carbon fibres.

To form the energy-absorbing region, what should be produced is a particular fibre architecture or layered structure for the fibres in order to obtain for the energy-absorbing member and the energy-absorbing device properties which are matched to the load case which is expected. A particular preference is for the material used for the energy-absorbing region to be a carbon-fibre reinforced plastics material because materials of this kind have very high specific strengths. By varying the proportion of fibres which are laid in the direction in which the shock force is transmitted, the strength and the response behaviour of the energy-absorbing device can be set.

What is to be understood by the expression "reduction to fibres of the energy-absorbing region formed from fibrous composite material" used herein is (deliberately induced) destruction of the fibrous structure of the fibrous composite material of which the energy-absorbing region is formed. In particular, the reduction to fibres of the energy-absorbing region formed from fibrous composite material is not equivalent simply to the occurrence of a (brittle) fracture in the energy-absorbing region; instead the fibrous composite material in the energy-absorbing region is broken down into individual pieces (fragments) to the extent of being pulverised in the course of the reduction to fibres.

Different variant designs may be considered for the energy-absorbing member and the mating member. It is for example conceivable for the mating member to take the form of a piston and at least that region of the energy-absorbing member which is adjacent the mating member to take the form of a cylinder, the mating member in the form of a piston being connected to the energy-absorbing member in such a way that, when the energy-absorbing device responds, the piston (mating member) travels into the cylinder (energy-absorbing member) and as it does so reduces the energy-absorbing region formed from fibrous composite material to fibres non-ductilely.

Specifically, it is conceivable for a region of the mating member which is adjacent the energy-absorbing member to be held telescopically by a region of the energy-absorbing member which is adjacent the mating member in such a way that the end-face of the region of the mating member which is adjacent the energy-absorbing member butts against an abutment belonging to the energy-absorbing region formed from fibrous composite material. This telescopic construction ensures that the relative movement which occurs between the mating member and the energy-absorbing member when the energy-absorbing device responds is guided.

As an alternative to the above-mentioned embodiment in which the mating member takes the form of a piston which is held telescopically in the energy-absorbing member, at least that region of the mating member which is adjacent the energy-absorbing member may take the form of a cylinder and the energy-absorbing member may take the form of a piston, a region of the energy-absorbing member which is adjacent the mating member being held telescopically by a region of the mating member which is adjacent the energy-absorbing member. In particular, an end-face of the energy-absorbing region formed from fibrous composite material which is adjacent the mating member should preferably butt in this case against an abutment belonging to the mating member.

To enable the shock energy to be dissipated when the energy-absorbing device responds only by the energy-absorbing region formed from fibrous composite material, the end-face of that region of the mating member which is adjacent the energy-absorbing member should be of a strength which is higher than that of the energy-absorbing region formed from fibrous composite material. What, in fact, is then ensured is that the movement of the mating member relative to the energy-absorbing member which occurs when the energy-absorbing device responds results only in the destruction of the energy-absorbing region, other components of the energy-absorbing device not failing in this case. It is possible in this way to arrange for a sequence of events which can be laid down in advance to occur when energy is absorbed.

In a preferred embodiment of the energy-absorbing device according to the invention, the mating member takes the form of a hollow body which is open at its end-face adjacent the energy-absorbing member. Hence, at least some of the fragments of the energy-absorbing region formed from fibrous composite material which are produced when the mating member moves relative to the energy-absorbing member can be received in the interior of the hollow body. This embodiment of the energy-absorbing device according to the invention thus gives an energy-absorbing device which is fully encapsulated in the outward direction, it being ensured in particular that, when the energy-absorbing device responds, no parts, such as fragments or pieces of fibre say, from the energy-absorbing region fly around and possibly injure people or damage or even destroy other components.

As already indicated, energy absorption is caused by the solution according to the invention by, in a sequence of events which is laid down in advance, at least part of the energy-absorbing region formed from fibrous composite material being reduced to fibres non-ductilely when the energy-absorbing device responds. When this happens, that length of the energy-absorbing region which is reduced to fibres non-ductilely when there is a movement of the mating member relative to the energy-absorbing member depends on the distance covered by the relative movement between the mating member and the energy-absorbing member.

What is more, the invention is not limited to the fitting of the energy-absorbing device according to the invention to a track-borne vehicle, in particular a rail-borne vehicle. Instead, it is equally conceivable for a stationary item for the operation of track-borne vehicles, such, for example, as a buffer-stop, to be fitted with the energy-absorbing device according to the invention to enable at least some of the shock energy produced if a vehicle should impact on parts of the stationary item to be dissipated.

In what follows, exemplary embodiments of the energy-absorbing device according to the invention will be described by reference to the accompanying drawings.

BRIEF DESCRIPTION OF THE DRAWINGS

In the drawings:

FIG. 2 is a view in longitudinal section of the energy-absorbing device shown in FIG. 1;

FIG. 3 is a view of a detail of FIG. 2 in the transitional region between the mating member and the energy-absorbing region of the energy-absorbing device which is shown by way of example in FIG. 1;

FIG. 4 is a view in longitudinal section of a further embodiment of the energy-absorbing device according to the present invention;

FIG. 5 is a view of a detail of FIG. 4 in the transitional region between the mating member and the energy-absorbing region of the further embodiment of the energy-absorbing device according to the invention;

DESCRIPTION OF PREFERRED EMBODIMENTS

In what follows, a first exemplary embodiment of the energy-absorbing device 100 according to the present invention will be described by reference to the views shown in FIGS. 1 to 3.

Figure 1:
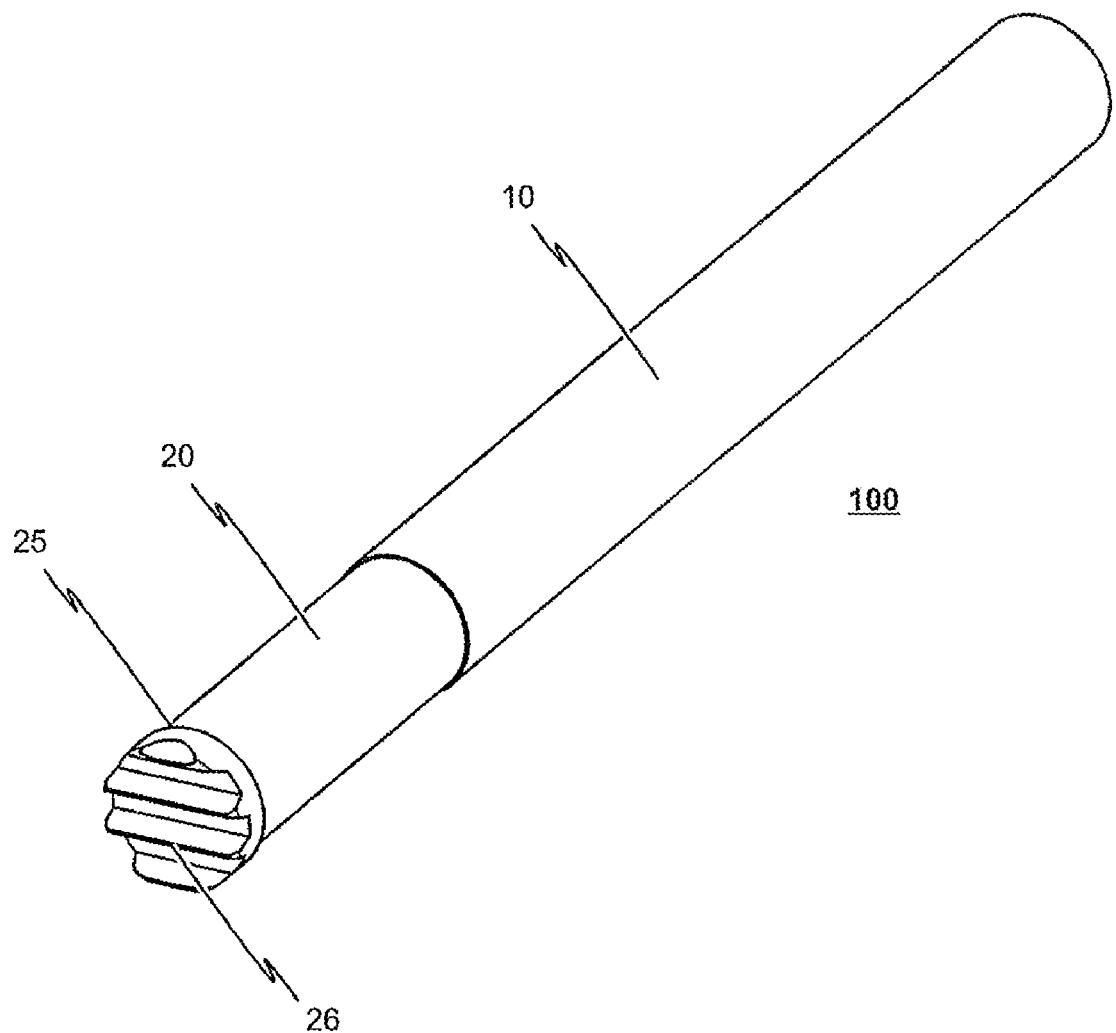
FIG. 1 is a three-dimensional view of an exemplary embodiment of the energy-absorbing device according to the invention.

As can be seen from the view shown in FIG. 1 in particular, the energy-absorbing device 100 consists in essence of an energy-absorbing member 10 and a mating member 20.

In FIG. 2, the energy-absorbing device shown in FIG. 1 is shown in a view in longitudinal section. It can be seen from this view that the mating member 20 is in the form of a piston and that that region 12 of the energy-absorbing member 10 which is adjacent the mating member 20 is in the form of a cylinder. That region 22 of the mating member 20 in the form of a cylinder which is adjacent the energy-absorbing member 10 is held telescopically by that region 12 of the energy-absorbing member 10 which is in form of a cylinder.

The construction and operation in particular of the embodiment of the energy-absorbing device 100 according to the invention which is shown in FIG. 1 will be described in detail below by reference to FIGS. 2 and 3.

Hence, in the embodiment of the energy-absorbing device 100 which is shown in FIG. 2, the energy-absorbing member 10 is formed in one piece from fibrous composite material. In particular, the energy-absorbing member 10 has an energy-absorbing region 11 and a guiding region 15. Provided at the transition between the energy-absorbing region 11 and the guiding region 15 is an edge which forms an abutment 13 against which the mating member 20 in the form of a piston butts.

It is conceivable in this case for the end-face 21 of that region 22 of the mating member 20 in the form of a piston which is adjacent the energy-absorbing member 10 to butt directly against the abutment 13 of the energy-absorbing region 11. However, in the embodiment of the energy-absorbing device 100 which is shown in FIG. 2, a tapered ring 23 is provided at the end-face 21 of the mating member 20 in the form of a piston and it is thus this tapered ring 23 which butts against the abutment 13 of the energy-absorbing region 11. The tapered ring 23 is connected solidly to the end-face 21 of the mating member 20 in this case.

In the embodiment of the energy-absorbing device 100 which is shown, the guiding region 15 of the energy-absorbing member 10 is in the form of a guiding tube whose inside diameter is larger than the outside diameter of the mating member 20 in the form of a piston. In this way, that region 22 of the mating member 20 which is adjacent the energy-absorbing member 10 can be held telescopically by the energy-absorbing member.

As can be seen particularly from the view in FIG. 3, the inside diameter of the energy-absorbing member 10 which, overall, is of a tubular form is smaller in the energy-absorbing region 11 than the outside diameter of the mating member 20. The edge 13 which is provided at the transition between the guiding region 15 and the energy-absorbing region 11 thus constitutes an abutment against which the mating member 20 in the form of a piston butts.

The energy-absorbing device 100 shown in FIG. 2 is so designed that shock forces applied to the energy-absorbing device 100, and in particular to the mating member 20 in the form of a piston, are applied to the end-face 25 remote from the energy-absorbing member 10 of the mating member 20. For this purpose, it is conceivable for an anti-ride-up device 26 to be mounted at the end-face 25 of the mating member 20. This is of advantage particularly when the energy-absorbing device 100 is used as a safety device against shock loads in a track-borne vehicle, in particular a rail-borne vehicle. In the event of a crash, the anti-ride-up device 26 prevents the end-face 25 of the mating member 20 in the form of a piston from being able to skew out horizontally.

In normal operation, i.e. when the shock forces applied to the mating member 20 via its end-face 26 do not exceed the critical shock force for the response of the energy-absorbing device 100, the shock forces applied to the mating member 20 are applied via the end-face 21 of the mating member 20 (and via the tapered ring 23 if there is one) to the abutment 13 of the energy-absorbing region 11 of the energy-absorbing member 10. From there, the shock forces are transmitted to the structure of the body of the wagon or carriage to which the energy-absorbing device 100 is connected.

In the case of the solution according to the invention, the shock force which is critical for the response of the energy-absorbing device 100 is determined, on the one hand, by the properties of the material of the energy-absorbing region 11, in particular by its strength. In the present exemplary embodiment, the energy-absorbing region 11 consists of a fibrous composite material. On the other hand, the shock force which is critical for the response of the energy-absorbing device 100 is determined by the triggering of the energy-absorbing region 11 and by the geometry of the tapered ring 23. When the energy-absorbing device 100 responds, the fibrous composite material of the interior wall of the energy-absorbing region 11 is non-ductilely reduced to fibres by the mating member 20 which moves relative to the energy-absorbing member 10 in the direction of the energy-absorbing region 11.

What is essential in this case is that the mating member 20 which moves in the direction of the energy-absorbing region 11 non-ductilely reduces to fibres only that material of the energy-absorbing region 11 which forms the interior wall of the energy-absorbing region 11. As the energy is absorbed, the mating member 20 thus slides further into the energy-absorbing member 10 and as it does so shears away the inner area of the energy-absorbing region 11. As this shearing away takes place, material of the energy-absorbing region 11 is reduced to fibres, but the outer wall of the energy-absorbing region 11 is not affected. Being left in place, the outer wall of the energy-absorbing region 11 acts as a guiding surface to guide the movement of the mating member 20 relative to the energy-absorbing member 10.

So that it is only the fibrous composite material of the energy-absorbing region 11 and not, for example, the material of the mating member 20 which is reduced to fibres when the energy-absorbing device 100 responds, the end-face 21 of the mating member 20, or the tapered ring 23 (if there is one), should be of greater strength than the energy-absorbing region 11.

Figure 6:
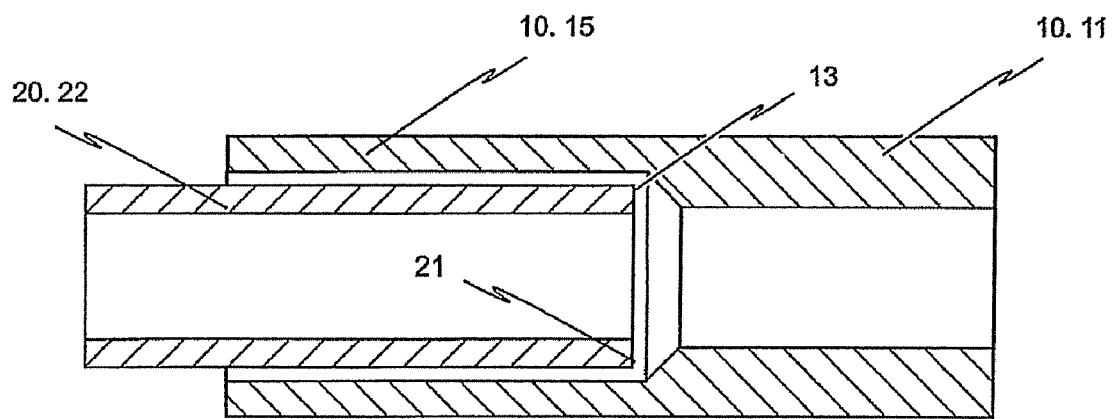
FIG. 6 is a fragmentary sectional view on a larger scale of the FIG. 1 energy absorbing device in a state prior to its response.
Figure 7:
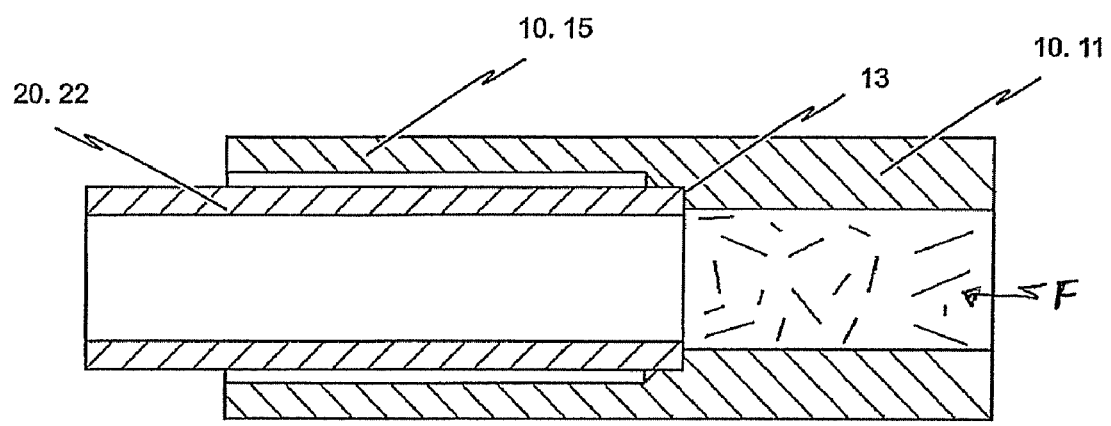
FIG. 7 is a similar view of that device in a state when the device does respond.

As can be seen in particular from the views in FIGS. 2, 3, 6 and 7, the mating member 20 in the form of a piston takes the form of a hollow body which is open at its end-face 21 adjacent the energy-absorbing member 10. Fragments of the energy-absorbing region 11 formed from fibrous composite material which are produced when the mating member 20 moves relative to the energy-absorbing member 10 (or at least some of them) are received in the interior of the hollow body when this happens. This has the advantage that no fragments of the fibrous composite material can make their way out to the exterior when the energy-absorbing region 11 is reduced to fibres. FIG. 6 shows the energy-absorbing device in a state prior to the response thereof. FIG. 7 shows the device in the state, when the energy-absorbing device responds and, in the course of the movement of the mating member 20 relative to the absorbing member 20, the energy-absorbing region 11 is at least partly non-ductily reduced to fibres. The resulting fibre fragments of the energy absorbing region 20 are depicted at F in FIG. 7 in the interior of the energy-absorbing member 20.

A further embodiment of the energy-absorbing device 100 in according to the invention is shown in FIG. 4. FIG. 5 shows a detail of FIG. 4 in the transitional region between the mating member 20 and the energy-absorbing region 11.

The embodiment of the energy-absorbing device 100 according to the invention which is shown in FIG. 4 substantially corresponds to the embodiment previously described by reference to the views in FIG. 2 and FIG. 3. However, in the embodiment of the energy-absorbing device 100 according to the invention shown in FIG. 4, the guiding region of the energy-absorbing member is not formed in one piece with the energy-absorbing region 11.

Instead—as can be seen in particular from the view in FIG. 5—in the embodiment of the energy-absorbing device 100 which is shown in FIG. 4, the energy-absorbing member 10 is formed from a guiding tube 16 which may, for example, be formed from fibrous composite material or some other material, with the energy-absorbing region 11 formed from fibrous composite material being held in this guiding tube 15. Responsibility for guiding the movement of the mating member 20 in the form of a piston relative to the energy-absorbing member 10 is assumed, in the embodiment shown in FIG. 4, by the inner face of the guiding tube 15.

In contrast to the embodiment shown in FIG. 2, what is reduced to fibres when energy is absorbed is not simply the inner region of the energy-absorbing region 11 but the whole of the material in the energy-absorbing region 11.

The invention is not limited to the embodiments of the energy-absorbing device 100 which have been described by reference to the drawings. Rather, there are other embodiments or modifications which are conceivable.

In particular, the invention is not limited to the mating member 20 taking the form of a piston and at least that region 12 of the energy-absorbing member 10 which is adjacent the mating member 20 taking the form of a cylinder, with that region 22 of the mating member 20 which is adjacent the energy-absorbing member 10 being held telescopically by the energy-absorbing member 10. Instead, it is, for example, also conceivable for the energy-absorbing member 10 to take the form of a piston and for at least that region 22 of the mating member 20 which is adjacent the energy-absorbing member 10 to take the form of a cylinder, with that region 12 of the energy-absorbing member 10 which is adjacent the mating member 20 being held telescopically by the mating member 20.

It is also conceivable, in the embodiment shown in FIG. 2, for the outer region of the energy-absorbing member 10, i.e. the outer wall of the energy-absorbing region 11, on the one hand, and the guiding region 15, on the other hand, to be made stronger as a whole than the region of the energy-absorbing region 11 which is reduced to fibres non-ductilely when the energy-absorbing device 100 responds, by giving the fibres of the fibrous composite material a suitable alignment.

The invention claimed is:

1. An energy-absorbing device (100), in the form of a safety device against shock loads for a track-borne vehicle, having an energy-absorbing member (10) and a mating member (20) which co-operates with the energy-absorbing member (10) in such a way that, if a critical shock force applied to the energy-absorbing device (100) is exceeded, the mating member (20) and the energy-absorbing member (10) move relative to one another, towards one another, while at the same time absorbing at least some of the shock energy which is applied to the energy-absorbing device (100), the energy-absorbing member (10) having at least one energy-absorbing region (11) made of fibrous composite material which, when the energy-absorbing device (100) responds, the fibrous composite material of the interior wall of the energy-absorbing region (11) is at least partly reduced to individual fibres fragments (F) non-ductilely by the mating member (20) which moves relative to the energy-absorbing member (10) in the direction of the energy-absorbing region (11), and wherein the mating member (20) takes the form of a hollow body which is open at its end-face (21) adjacent the energy-absorbing member (10) such that at least some of the fragments (F) of the energy-absorbing region (11) formed from fibrous composite material which are produced when the mating member (20) moves relative to the energy-absorbing member (10) can be received in the interior of the hollow body.

2. The energy-absorbing device (100) according to claim 1, wherein that length of the energy-absorbing region (11) which is reduced to fibres non-ductilely when there is a movement of the mating member (20) relative to the energy-absorbing member (10) depends on the distance covered by the relative movement between the mating member (20) and the energy-absorbing member (10).

3. The energy-absorbing device (100) according to claim 2, wherein at least the end-face (21) of the mating member (20) is of a higher strength than the energy-absorbing region (11).

4. The energy-absorbing device (100) according to claim 2, wherein a tapered ring (23) which butts against the abutment (13) of the energy-absorbing region (11) is provided at the end-face (21) of the mating member (20).

5. The energy-absorbing device (100) according to claim 1, wherein the mating member (20) takes the form of a piston and at least that region (12) of the energy-absorbing member (10) which is adjacent the mating member (20) takes the form of a cylinder, and wherein that region (22) of the mating member (20) which is adjacent the energy-absorbing member (10) is held telescopically by the energy-absorbing member (10) in such a way that the end-face (21) of that region (22) of the mating member (20) which is adjacent the energy-absorbing member (10) butts against an abutment (13) belonging to the energy-absorbing region (11).

6. The energy-absorbing device (100) according to claim 1, wherein at least that region (22) of the mating member (20) which is adjacent the energy-absorbing member (10) takes the form of a cylinder and the energy-absorbing member (10) takes the form of a piston, and wherein that region (12) of the energy-absorbing member (10) which is adjacent the mating member (20) is held telescopically by the mating member (20) in such a way that the end-face (14) of the energy-absorbing region (11) which is adjacent the mating member (20) butts against an abutment (24) belonging to the mating member (20).

7. The energy-absorbing device (100) according to claim 1, wherein at least one guiding surface (15a) is provided to guide the movement of the mating member (20) relative to the energy-absorbing member (10).

8. The energy-absorbing device (100) according to claim 1, wherein the energy-absorbing member (10) is formed entirely from fibrous composite material.

9. The energy-absorbing device (100) according to claim 1, wherein the mating member (20) is formed from fibrous composite material.

10. The energy-absorbing device (100) according to claim 1, wherein the response behaviour of the energy-absorbing device (100) and/or the overall amount of shock energy which can be absorbed by the energy-absorbing device (100) can be set in advance by a suitable choice of wall-thickness and/or strength for the energy-absorbing region (21).

11. Use of the energy-absorbing device (100) according to claim 1 as a safety device against shock loads in the main frame or the structure of the body of a rail-borne vehicle or as a safety device against shock loads for a buffer-stop.

12. An energy-absorbing device (100), in the form of a safety device against shock loads for a track-borne vehicle, having an energy-absorbing member (10) and a mating member (20) which co-operates with the energy-absorbing member (10) in such a way that, if a critical shock force applied to the energy-absorbing device (100) is exceeded, the mating member (20) and the energy-absorbing member (10) move relative to one another, towards one another, while at the same time absorbing at least some of the shock energy which is applied to the energy-absorbing device (100), the energy-absorbing member (10) having at least one energy-absorbing region (11) made of fibrous composite material which, when the energy-absorbing device (100) responds, the whole of the material in the energy-absorbing region (11) is at least partly reduced to individual fibre fragments (F) non-ductilely by the mating member (20) which moves relative to the energy-absorbing member (10) in the direction of the energy-absorbing region (11), and wherein the mating member (20) takes the form of a hollow body which is open at its end-face (21) adjacent the energy-absorbing member (10) such that at least some of the fragments (F) of the energy-absorbing region (11) formed from fibrous composite material which are produced when the mating member (20) moves relative to the energy-absorbing member (10) can be received in the interior of the hollow body, and wherein the energy-absorbing member (10) has a guiding tube (15) whose inside diameter is larger than the outside diameter of the mating member (20), thus enabling that region (22) of the mating member (20) which is adjacent the energy-absorbing member (10) to be held telescopically by the energy-absorbing member (10).

13. The energy-absorbing device (100) according to claim 12, wherein that length of the energy-absorbing region (11) which is reduced to fibre fragments (F) non-ductilely when there is a movement of the mating member (20) relative to the energy-absorbing member (10) depends on the distance covered by the relative movement between the mating member (20) and the energy-absorbing member (10).

14. The energy-absorbing device (100) according to claim 12, wherein the guiding tube (15) and the energy-absorbing region (11) are formed in one piece from fibrous composite material.

15. The energy-absorbing device (100) according to claim 12, wherein the energy-absorbing region (11) formed from fibrous composite material is arranged in the interior of the guiding tube (15) in such a way that the end-face (21) of the mating member (20) butts against an end-face (14) of the energy-absorbing region (11) which is adjacent the mating member (20).

* * * * *